United States Patent
Zur et al.

(10) Patent No.: US 9,747,167 B2
(45) Date of Patent: Aug. 29, 2017

(54) PERSISTENCY FREE ARCHITECTURE

(71) Applicant: NICE-SYSTEMS LTD., Ra'anana (IL)

(72) Inventors: Tal Zur, Rishon-Lezion (IL); Efim Kolodizner, Ashdod (IL)

(73) Assignee: NICE LTD., Ra'anana (IL)

( * ) Notice: Subject to any disclaimer, the term of this patent is extended or adjusted under 35 U.S.C. 154(b) by 286 days.

(21) Appl. No.: 14/191,837

(22) Filed: Feb. 27, 2014

(65) Prior Publication Data

US 2015/0242285 A1 Aug. 27, 2015

(51) Int. Cl.
*G06F 11/00* (2006.01)
*G06F 11/14* (2006.01)

(52) U.S. Cl.
CPC .................. *G06F 11/1441* (2013.01)

(58) Field of Classification Search
CPC ......... G06F 17/30212; G06F 17/30265; G06F 11/0793; G06F 11/1435; G06F 11/1446; G06F 11/1448
See application file for complete search history.

(56) References Cited

U.S. PATENT DOCUMENTS

| | | | | |
|---|---|---|---|---|
| 4,636,876 A * | 1/1987 | Schwartz | ............... | G11B 20/10 360/32 |
| 5,557,724 A * | 9/1996 | Sampat | ............... | H04L 12/1859 348/E5.105 |
| 5,568,614 A * | 10/1996 | Mendelson | ............. | G06F 9/542 375/E7.093 |
| 5,675,511 A * | 10/1997 | Prasad | ..................... | H04M 3/36 375/E7.004 |
| 5,893,053 A * | 4/1999 | Trueblood | ............ | G06F 9/4443 702/187 |
| 6,049,892 A * | 4/2000 | Casagrande | ............ | H04L 29/06 714/18 |
| 6,122,665 A * | 9/2000 | Bar | ....................... | H04L 65/607 379/88.17 |
| 6,658,590 B1 * | 12/2003 | Sicola | ................. | G06F 11/1471 714/15 |

(Continued)

OTHER PUBLICATIONS

Oracle "PeopleTools 8.53: BI Publisher for PeopleSoft" Feb. 2013, Oracle, p. 1-112.*

(Continued)

*Primary Examiner* — Bryce Bonzo
*Assistant Examiner* — Jeison C Arcos
(74) *Attorney, Agent, or Firm* — Pearl Cohen Zedek Latzer Baratz LLP

(57) ABSTRACT

System and method for persistency free management of media storage including, during routine operation: continuously receiving streams of data; storing the streams of data in corresponding files in a non-volatile storage; including in the files a tag indicating whether the file is categorized as active or inactive; and when recovering from a crash: generating a list of active files by scanning the files and identifying active files. System and method for recovering after controller crash may include: during routine operation: continuously handling by the controller processes related to media metadata, by sending commands to a controlled device; sending state parameters related to the processes to the controlled device; and when recovering from the crash: retrieving the state parameters from the controlled device.

13 Claims, 5 Drawing Sheets

(56) References Cited

U.S. PATENT DOCUMENTS

| | | | | |
|---|---|---|---|---|
| 6,820,098 | B1* | 11/2004 | Ganesh | G06F 11/2074 |
| 8,015,570 | B2* | 9/2011 | Venkatraman | G06F 17/30067 |
| | | | | 707/809 |
| 8,229,897 | B2* | 7/2012 | Cannon | G06F 11/1469 |
| | | | | 707/644 |
| 2003/0009337 | A1* | 1/2003 | Rupsis | H04L 29/06027 |
| | | | | 704/260 |
| 2003/0009718 | A1* | 1/2003 | Wolfgang | H04L 1/1867 |
| | | | | 714/751 |
| 2003/0182312 | A1* | 9/2003 | Chen | G06F 11/1435 |
| 2003/0182313 | A1* | 9/2003 | Federwisch | G06F 11/2066 |
| 2003/0182322 | A1* | 9/2003 | Manley | G06F 17/30212 |
| 2004/0006433 | A1* | 1/2004 | Robson | G06F 19/22 |
| | | | | 702/20 |
| 2004/0148308 | A1* | 7/2004 | Rajan | G06F 17/30595 |
| 2005/0102561 | A1* | 5/2005 | Graham | H04L 69/40 |
| | | | | 714/15 |
| 2006/0195322 | A1* | 8/2006 | Broussard | G11B 27/034 |
| | | | | 704/270 |
| 2007/0078876 | A1* | 4/2007 | Hayashi | G06F 17/30035 |
| 2007/0204003 | A1* | 8/2007 | Abramson | H04L 67/02 |
| | | | | 709/217 |
| 2008/0208922 | A1* | 8/2008 | Wolas-Shiva | G06F 17/30265 |
| 2009/0157893 | A1* | 6/2009 | Lazar | H04N 21/4126 |
| | | | | 709/231 |
| 2009/0259700 | A1* | 10/2009 | Waselewski | G06F 11/3476 |
| 2015/0186217 | A1* | 7/2015 | Eslami Sarab | G06F 11/1446 |
| | | | | 707/649 |

OTHER PUBLICATIONS

Oracle "Creating Report Definitions" retrieved Feb. 8, 2016 based on PeopleToools 8.53, Oracle, p. 1-13.*
Oracle "PeopleTools 8.53: Installation for Oracle" Feb. 2013, Oracle, p. 1-799.*
Galbraith, "SSH File Transfer Protocol" Jan. 2007, Secure Shell Working Group, pp. 1-60.*
Apple, "Using NSURLDownload" Oct. 22, 2013, Apple Developer, p. 1-7.*
WinSCP, "WinSCP" Jul. 2011, WinSCP, p. 1-26.*

* cited by examiner

PERSISTENCY FREE ARCHITECTURE

BACKGROUND

Software persistency relates to storing data about a state of a system, or a component within a system, in a non-volatile memory. For example, in a system that records streamed data into files, persistency data may include a dynamic list of open or active files, their location on the disk and their respective stream identification. In case of a system crash, e.g., if the system stops to operate for some reason, the last state of the system will be saved. The saved persistency data may be used for recovery later on. After the system recovers and resumes operation, the persistency data may be read from the non-volatile memory, and the system may resume operation smoothly. For example, data of the same stream may be written to open files or open files may be closed.

A system that records audio into files on a storage device would save in a persistency database, the state of the calls and the location of the respective files on the storage. When a call ends, the system would finalize the file and clear the relevant data from the persistency database. In case of a system crash, a recovery mechanism may fetch from the persistency database the list of active calls and their locations on the storage. Based on this information, the recovery mechanism may finalize the files and clear the persistency database.

Smooth recovery after a crash may be an essential requirement for many systems. However, keeping an up-to-date and accurate persistency databases increases software complexity and is costly in terms of computing power.

SUMMARY

According to embodiments of the present invention, there is provided a method for managing media storage, the method may include: during routine operation: continuously receiving streams of data; storing the streams of data in corresponding files in a non-volatile storage; including in the files a tag indicating whether the file is categorized as active or inactive; and when recovering from a crash: generating a list of active files by scanning the files and identifying active files.

Furthermore, according to embodiments of the present invention, the tag may be a part of file names of the files and the scanning of the files may include scanning of the file names.

Furthermore, according to embodiments of the present invention, the method may include: during routine operation: storing the files in the non-volatile storage in a location that is indicative of the time the files where created.

Furthermore, according to embodiments of the present invention, the method may include: when recovering from the crash: scanning the files stored in the non-volatile storage unit in a location that is associated with a predetermined time period before the crash.

Furthermore, according to embodiments of the present invention, the method may include: when recovering from the crash: closing the active files by replacing the tag with a tag indicating that the files are categorized as inactive.

Furthermore, according to embodiments of the present invention, the streams of data may include media packets pertaining to an interaction, and the method may further include: during routine operation: adding to a file header identifiers associating each file with a respective interaction.

Furthermore, according to embodiments of the present invention, the method may include: when recovering from the crash: associating each of the active files with its respective interaction according to the identifiers in the header of the file.

Furthermore, according to embodiments of the present invention, the identifiers associating each file with its respective interaction may be selected from the list consisting of: interaction identification, compound identification, recorded session identification and time of start of recorded session.

According to embodiments of the present invention, there is provided a method for recovering after controller crash, the method may include: during routine operation: continuously handling by the controller processes related to media metadata, by sending commands to a controlled device; sending state parameters related to the processes to the controlled device; and when recovering from the crash: retrieving the state parameters from the controlled device.

Furthermore, according to embodiments of the present invention, the media metadata may include interaction metadata, the processes handled by the controller may include recording of the media data, and the controlled device may be a recorder configured to record the media data.

Furthermore, according to embodiments of the present invention, the state parameters may be selected from a list including: interaction identification, compound identification, participants and start time of the interaction.

According to embodiments of the present invention, there is provided a system for managing media storage, the system may include: a non-volatile storage unit; and a recorder that may be configured to: during routine operation: continuously receive streams of data; store the streams of data in corresponding files in the non-volatile storage unit; include in the files a tag indicating whether the file is categorized as active or inactive; and when recovering from a crash: generate a list of active files by scanning the files and identifying active files.

Furthermore, according to embodiments of the present invention, the tag may be a part of file names of the files and the scanning of the files may include scanning of the file names.

Furthermore, according to embodiments of the present invention, during routine operation the recorder may be further configured to: store the files in the non-volatile storage unit in a location that is indicative of the time the files where created.

Furthermore, according to embodiments of the present invention, when recovering from a crash the recorder may be further configured to: scan the files stored in the non-volatile storage unit in a location that is associated with a predetermined time period before the crash.

Furthermore, according to embodiments of the present invention, when recovering from a crash the recorder may be further configured to: close the active files by replacing the tag with a tag indicating that the files are categorized as inactive.

Furthermore, according to embodiments of the present invention, the streams of data may include media packets pertaining to an interaction, and wherein during routine operation the recorder may be further configured to: add to a file header identifiers associating each file with a respective interaction.

Furthermore, according to embodiments of the present invention, when recovering from a crash the recorder may be further configured to: associate each of the active files with its respective interaction according to the identifiers in the header of the file.

According to embodiments of the present invention, there is provided a system for recovering after controller crash, the system may include: a controlled device; and a controller that may be configured to: during routine operation: continuously handle processes related to media metadata, by sending commands to the controlled device; send state parameters related to the processes to the controlled device; and when recovering from the crash: retrieve the state parameters from the controlled device.

Furthermore, according to embodiments of the present invention, the media metadata may include metadata, the processes handled by the controller may include recording of the media data, and the controlled device may be a recorder configured to record the media data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
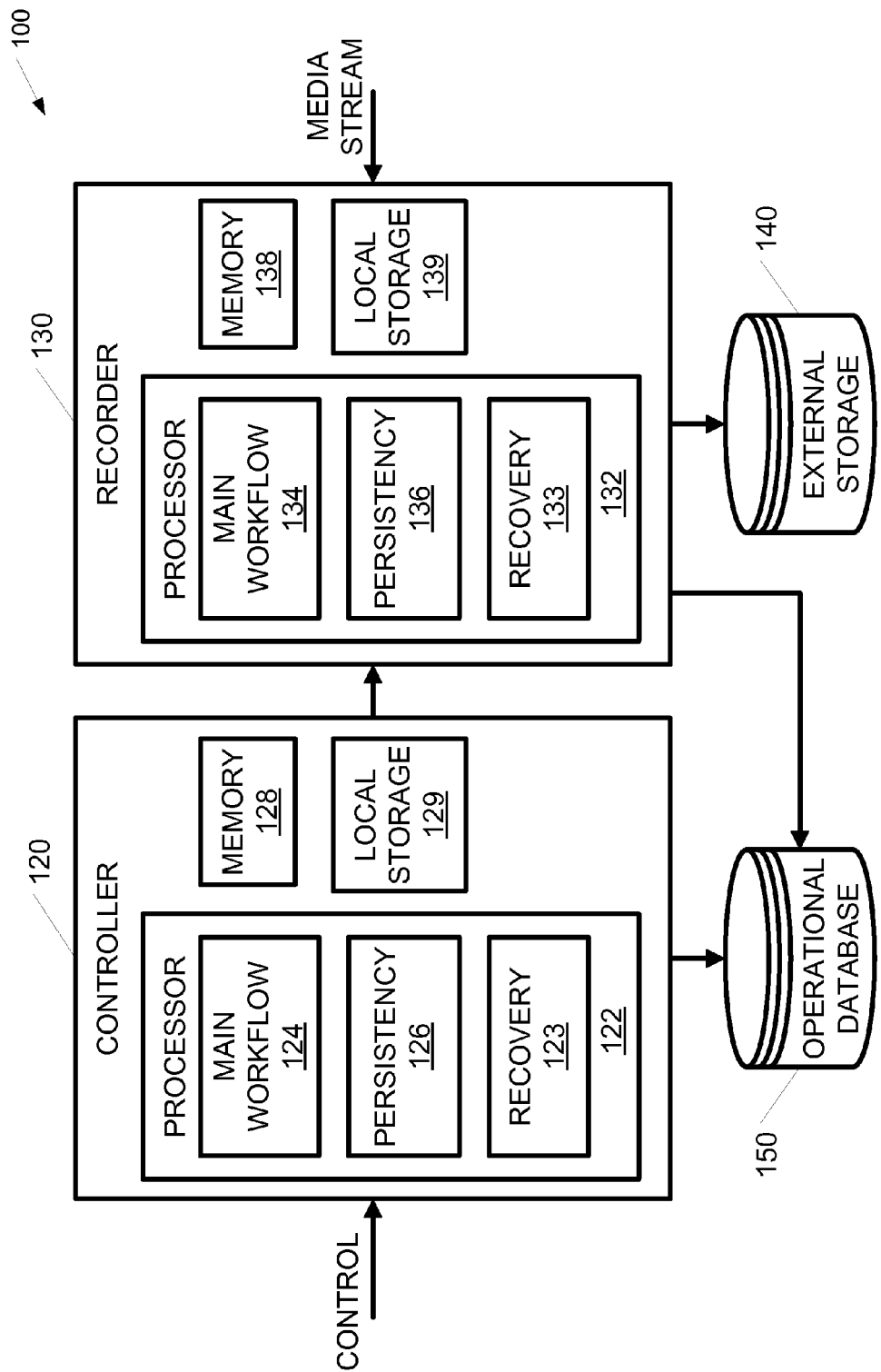
FIG. 1 is a schematic block diagram illustrating a prior art recording system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

According to embodiments of the present invention, persistency mechanisms may be replaced by saving the data that is needed for the recovery of the state as part of the main workflow of the system, eliminating the need to keep and constantly update persistency databases.

As used herein, the term "storage unit" may refer to any non-volatile storage device including any apparatus, device, system and/or array of devices that is configured to store data, for example, audio recordings. Each of the storage units may include the ability to write data to the storage and read the data from the storage unit for further use, e.g., audio files may be read from the storage unit, upon a request, for example, when recovering from a crash. As used herein a crash of a processor or a system may refer to a situation in which the processor or system cease to function properly or halts for some reason.

Although embodiments of the invention are described with relation to recording of audio data of telephone call interactions, it will be apparent to those skilled in the art that embodiments of the invention may be used for any real time recording of any type of digital media such as video, audio, text, screen captures and the like, and any combination thereof.

Reference is made to FIG. 1 which is a schematic block diagram illustrating a conventional recording system 100. System 100 may include a controller 120, a recorder or recording unit 130, an operational database 150 and non volatile external storage 140.

Operational database 150 may store general data and metadata required for keeping a log of the system activities. For example, operational database 150 may store metadata of calls that have ended, system configuration parameters, analysis results, etc.

Each of controller 120 and recorder 130 may include a processor 122, 132, respectively, a volatile memory unit 128, 138, respectively, and a non-volatile local storage unit 129, 139, respectively. Processors 122, 132 may be configured to execute commands included in a program, algorithm or code stored in the respective memory units 128, 138. Each of processors 122, 132 may include components such as, but not limited to, one or more central processing units (CPU) or any other suitable multi-purpose or specific processors or controllers, one or more input units, one or more output units or any other suitable hardware components and/or software components. Processor 122 may be any computation device that is configured to execute various operations including operations related to main workflow block 124, persistency block 126 and recovery block 123. Processor 132 may be any computation device that is configured to execute various operations including operations related to main workflow block 134, persistency block 136 and recovery block 133 of recorder 130. Throughout the description various operations performed by processors are described with relation to logical blocks such as main workflow block 124, persistency block 126 and recovery block 123. The classification of operations that are performed by processors to logical blocks is made for clarity reasons only and is non-binding.

Memory units 128, 138 may be a non-transitory computer-readable storage medium that may store thereon instructions that when executed by processors 122, 132, respectively, cause the respective processor to perform operations and/or methods, for example, the method disclosed herein. Non-volatile local storage units 129, 139 may store, inter alia, a persistency database, e.g., non-volatile memory unit 129 may store the persistency database of controller 120 and non-volatile memory unit 139 may store, inter alia, the persistency database of recorder 130.

External storage 140 may include network storage device, e.g., storage units that are available to the recorder 130 via a network (not shown). External storage 140 may be configured, for example, as a Storage Area Network (SAN), as a Network Attached Storage (NAS), as a cloud service or the like. Local storage units 129, 139 may each include a direct access storage device, also referred to as Direct-Attached Storage (DAS), e.g., a storage unit that is directly connected to controller 120 and recorder 130, respectively. External storage 140 and local storage units 129, 139 may each include one or more non volatile mass storage devices such as Secure Digital (SD) cards, optical storage devices such as CDs, DVDs, or laser disks, magnetic storage devices such as tapes, hard disks, Redundant Array of Independent Disks (RAID), or the like. System 100 may include both external storage 140 and local storage units 129, 139. For example, external storage 140 may store streamed data while local storage units 129, 139 may store persistency data. Alternatively, system 100 may include local storage units 129, 139 and not include external storage 140, or may include only external storage 140 and not include one or both of local storage units 129, 139.

During routine operation, recorder 130 may obtain streams of data to be recorded on external storage 140 or local storage 139, and controller 120 may obtain control information related to these steams of data. For example, these streams of data may include audio information related to an interaction that is intended to be recorded and the control information may include computer-telephony integration (CTI) information related to the interaction. An interaction may include telephone calls, on-line chats, emails, video conferencing, and the like and the recorded data may include any type of digital data exchanged in the interaction such as audio, text, screen activity, video etc.

During routine operation, controller 120 may be notified that an interaction has initiated. For example, controller 120 may be notified from a private automatic branch exchange (PABX) that a telephone call has initiated. The main workflow block 124 of controller 120 may generate the telephone call metadata, for example as a CTI data, and may request recorder 130 to record the interaction. Persistency block 126 of controller 120 may store the state information of the interaction in a controller persistency file on local storage unit 129 or external storage 140. The state information may include, for example, interaction metadata, state of the interaction and recording metadata. As used herein, interaction metadata may include general information regarding the interaction, for example, start time of the interaction, type of the interaction, e.g. audio, video, text, etc., the telephone numbers of the caller and the called party, etc. Recording metadata may include general information regarding the recording, for example, start time of the recording, type of the recording, e.g. audio, video, text, etc. It should be noted that recording metadata may be different from the interaction metadata of the same interaction. For example, an interaction may start at a certain time while the recording of the interaction may start some time after the interaction has started. The state of the interaction may indicate the status of the interaction, e.g., is it on going or has it ended, is it being recorded, etc. The state of the interaction may include indications of error conditions of the interaction or the recording. Whenever the status of the interaction changes, e.g., when the recording of a certain interaction has stopped or initiated again, persistency block 126 updates the interaction state in the controller persistency file. When controller 120 is notified that the interaction has ended, main workflow block 124 of controller 120 may request recorder 130 to stop the recording and update operational database 150, and persistency block 126 of controller 120 may delete the state information of the interaction that has ended from the controller persistency file.

In case controller 120 crashes, the state information including interaction metadata, state of the interaction and recording metadata of all ongoing interactions that is saved in controller persistency file on non-volatile memory unit 129 represents the state of controller 120 just prior to the crash. When controller 120 resumes operation, a recovery mechanism 123 may fetch from the controller persistency file the state information including a list of interactions that were active when controller 120 crashed, their state, interaction metadata and recording metadata. Recovery mechanism 123 may build the full interaction state including metadata and recording state based on the retrieved state information.

During routine operation, recorder 130 may be requested to record an interaction from controller 120. As long as the interaction is active, main workflow block 134 of recorder 130 may record the streamed data of the interaction to files on storage 140 or local storage 139. Persistency block 136 of recorder 130 may store state information in a recorder persistency file on local storage 139. The state information may include state of the interaction and location of the active file on storage 140 or local storage 139. When the interaction ends, main workflow block 134 of recorder 130 may close or inactivate the file on storage 140. Persistency block 136 of recorder 130 may clear from the recorder persistency file information regarding the file that has been closed.

A file in storage 140 or local storage 139 may be defined as open (active file) or closed (inactive file). After a file is created it is open and data may be stored in the file. A stream of a single interaction may be stored in a single file or in a plurality of files, according to design preferences. If a stream of a single interaction is written to a single file, a file may be created or opened for each interaction that has to be recorded. This file may remain open or active as long as the recording of the interaction continues, and data may be written to the file. The file may remain open until the recording of the interaction ends and all the data associated with the interaction that was intended to be recorded is stored in the file. After the recording of the interaction ends and all the data that was intended to be recorded is stored in the file, the file is considered closed, or inactive. If the capacity of the files is limited, a stream of a single interaction may be stored in a plurality of files. A first file may be created or opened for each interaction that has to be recorded. This file may remain open or active as long as the recording of the interaction continues, and the file is not full, e.g., as long as the file has not reached its capacity limit. When the file is full it is closed or inactivated, and an additional file is opened for writing of additional streamed data, and so on. After the recording of the interaction ends and all the data that had to be recorded is stored, the last file is closed, or inactivated. Whenever a file changes its status, e.g., when a file is created or is closed, persistency block 136 of recorder 130 has to update the recorder persistency file on non-volatile memory unit 139.

In case recorder 130 crashes, the state information including the state of the interactions and the location of the active file on storage 140 or local storage 139 just prior to the crash is present at the recorder persistency file on local storage 139 or storage 140. Thus, the data stored in the recorder persistency file on local storage 139 or storage 140 represents the state of recorder 130 just prior to the crash. When recorder 130 resumes operation, it is needed to restore the list of active or open files in order for system 100 to continue to operate properly. Thus, a recovery mechanism 133 may fetch from the recorder persistency file the state information including the list of files that were active when recorder 130 crashed, their location, and other information that has been stored in the recorder persistency file. Recovery mechanism 133 may either continue to store data at the open files or close the open files based on the retrieved state information. Persistency block 136 of recorder 130 may continue to update the state information in the recorder persistency file saved on non-volatile memory unit 139 or storage 140.

Figure 2:
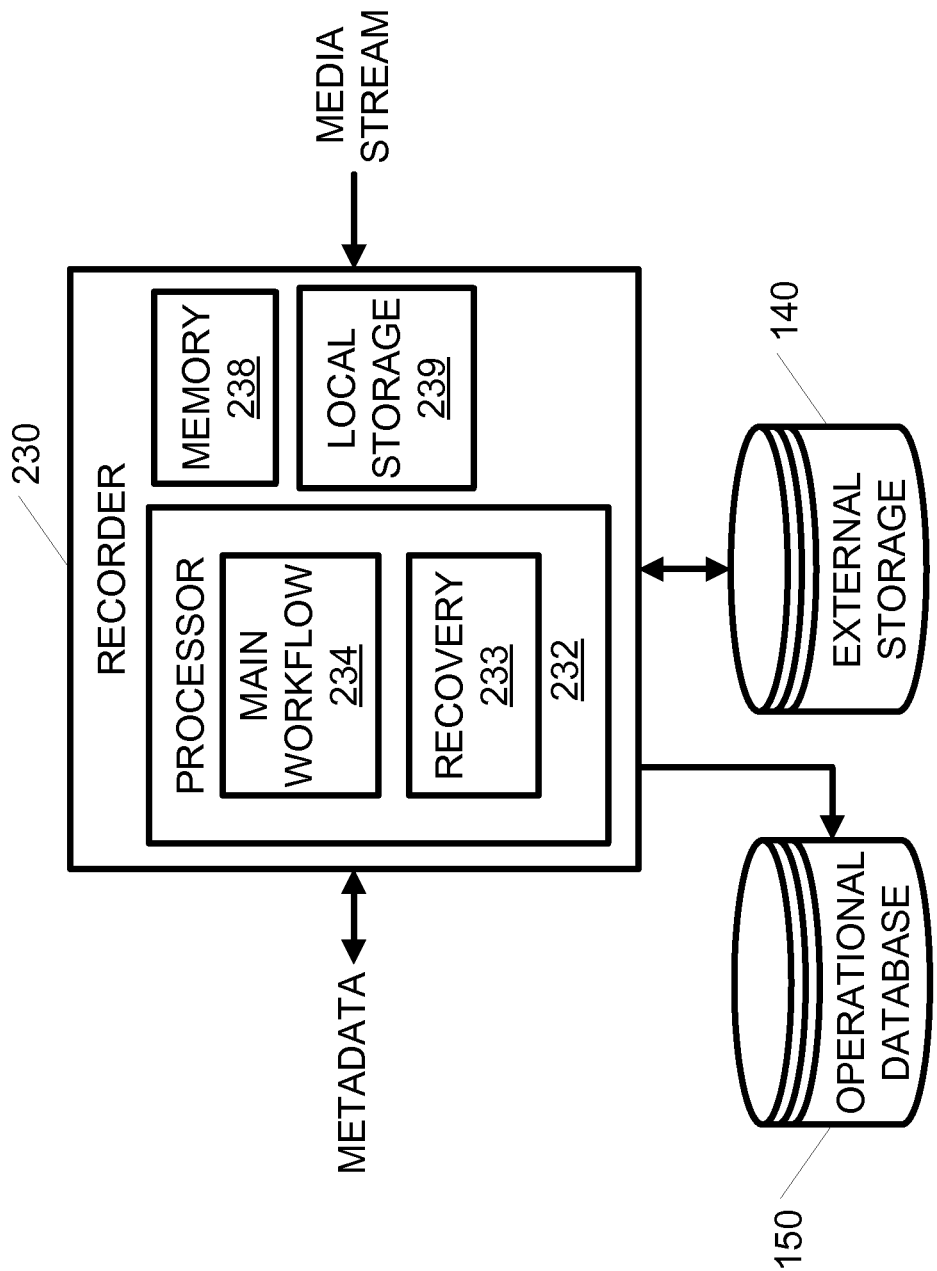
FIG. 2 is a schematic block diagram illustrating a persistency free recorder according to embodiments of the present invention.

Reference is now made to FIG. 2 which is a schematic block diagram illustrating a persistency-free recorder 230 according to embodiments of the present invention. Recorder 230 may include a processor 232, memory unit 238 and local non-volatile storage unit 239. Processor 232 may be any computation device that is configured to execute various operations including operations related to the main workflow block 234 and recovery block 233. Processor 232 may include components similar to those of processor 132. Memory unit 238 may be a non-transitory computer-readable storage medium that may store thereon instructions that when executed by processor 232 cause processor 232 to perform operations and/or methods, for example, the method disclosed herein. According to embodiments of the present invention, state information that is needed to resume operation of recorder 230 when recovering from a crash is saved by the main workflow block 234 obviating the need for updating a dedicated recorder persistency file on non-volatile storage unit 239 or external storage 140. Recorder 230 may include local non-volatile storage unit 239, or be connected to an external storage unit 140, or to both.

Figure 4:
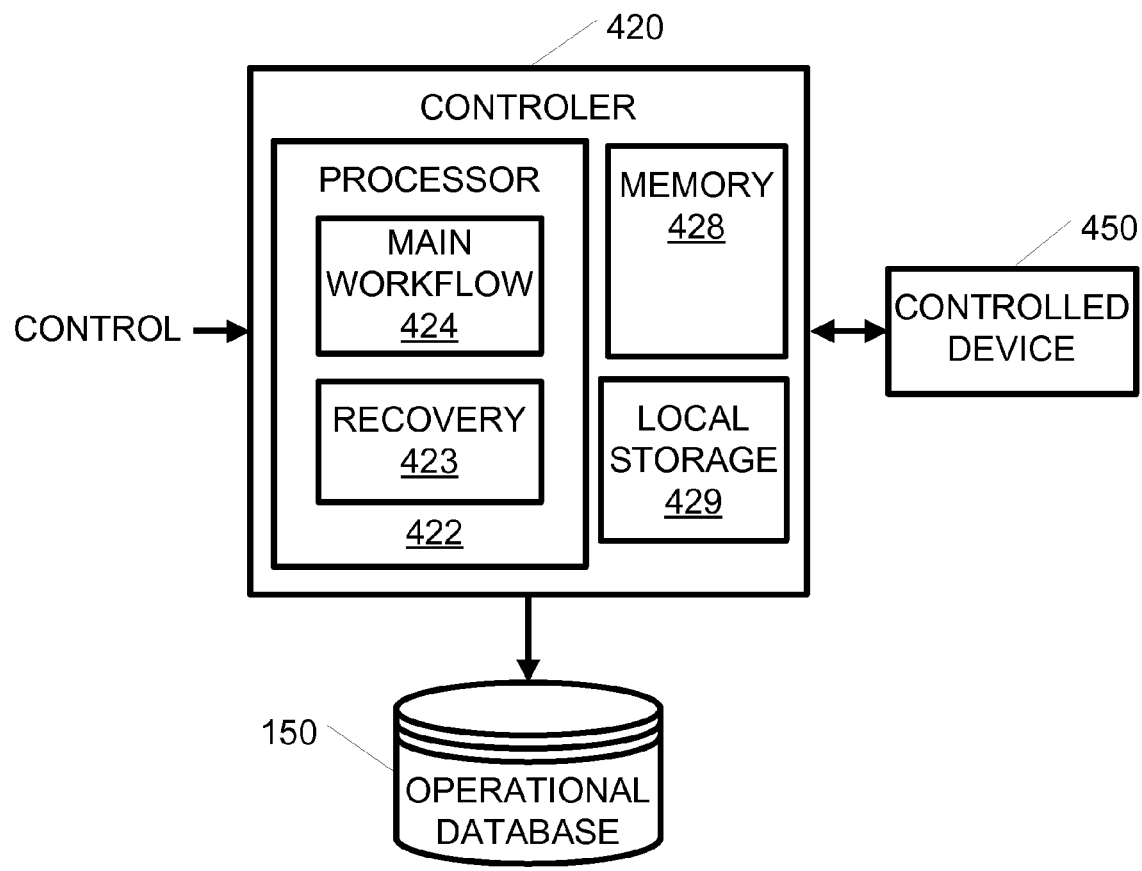
FIG. 4 is a schematic block diagram illustrating a persistency free controller according to embodiments of the present invention.

During routine operation, recorder 230 may be requested by a controller, such as controller 120 depicted in FIG. 2 or controller 420, depicted in FIG. 4, to record an interaction. Recorder 230 may obtain metadata of the interaction from the controller. As long as the interaction continues, main workflow block 234 of recorder 230 may open files on either local storage unit 239 or on external storage unit 140, store streamed data into the files and close the files. No dedicated persistency database is maintained and updated on a non-volatile storage device. Instead, main workflow block 234 of recorder 230 may create files on non-volatile storage 140 or local storage 239 in a way so that all the state information required for resuming operation of recorder 130 when recovering from a crash will be available in the files.

According to some embodiments of the present invention, files that are created for storing recorded data, for example, by main workflow block 234 of recorder 230, may include in the file a tag indicating whether the file is categorized as active or inactive. For example, the tag may be included in the names of the files, e.g., the tag may be included in the filename extension. For example, new files may be opened with filename extension indicating that the files are active, e.g., .TMP. Additionally, main workflow block 234 of recorder 230 may store the files in non-volatile storage 140 or local storage 239 in a location that is indicative of the time the files where created. For example, the files may be opened in a predefined folder according to the date and time of the day in which they were created. According to some embodiments, main workflow block 234 of recorder 230 may add to the header of the files status information related to the file. For example, the status information that may be added to the header may include identifiers associating each file with its respective interaction. According to some embodiments the status information that is saved in the header may include the metadata of the interaction, and/or any other information as may be required for the specific implementation.

For example, if the interaction is a telephone call, the metadata that may be obtained from the controller and saved as status information in the file header may include interaction identification, compound identification, recorded session identification, and time of start of recorded session. The compound identification parameter may refer to a logical representation of a complete call. A single compound may include one or more internal parts that are referred to herein as interactions. For example, if a customer calls a contact center, and is being transferred from one agent to another, then the entire call is referred to as a compound call that includes two interactions, the first interaction includes the conversation between the customer and the first agent and the second interaction includes the conversation between the customer and the second agent. The interaction identification may identify a single interaction. A single interaction may contain at least two recordings also referred to as recorded sessions or sessions, one for each participant of the interaction. Recorded session identification may identify a specific session or a plurality of sessions of a single interaction, e.g. in the example given hereinabove there would be a single compound that includes two interactions, where each interaction includes two sessions, one for the customer voice and one for the agent. Time of start of recorded session may include the start time of the recording. It should be readily understood that the specific status parameters that are saved in the file header are application specific. The status parameters listed herein are given by way of example.

According to some embodiments, main workflow block 234 of recorder 230 may handle a list of active files in the cache of volatile memory 238 only. Keeping a list of active files in volatile memory 238 is different from keeping persistency data at least because of the following reasons. The writing operation to external storage 140 or local storage 239 is more complex than writing to volatile memory 238, in terms of the processing complexity and usage of input/output (TO) bus. Secondly, data in volatile memory 238 is lost at system shutdown, thus, it cannot be used for restoring the state when recovering from a crash.

When an interaction ends, main workflow block 234 of recorder 230 may close the file. Closing the file may include finding the relevant record of the file in the internal memory cache, retrieving from the file record the location of the file on storage 140 or local storage 239, updating the file status to close in the relevant record of the file in the internal memory cache, and closing the file by changing the tag to indicate that the file is inactive. For example, the file extension may be changed from .TMP to .NMF. The closing of the file may be reported to operational database 150.

When the file is inactive it is ready for archiving, playback and other operation as may be needed.

In case recorder 130 crashes, recovery mechanism 233 may generate a list of active files by scanning the files in external storage 140 or local storage 239 and identifying active files. Files may be identified as active according to the value of the tag in the file name. Recovery mechanism 233 may fetch open files from storage 239, 140.

If files were stored in storage 140, 239 in a location that is indicative of the time the files where created, locations that are associated with files that were created a predetermined time, denoted X, before the crash has occurred may be scanned. For example, if during routine operation, a folder is created for storing currently opened files every Y minutes, than after a crash, the last X/Y folders may be scanned. X and Y may be determined based on prior knowledge of system behavior and the intended application of the system. For example, if the system is intended for recording customer service interactions of an organization, statistics regarding interaction lengths and number of interactions per time may be used to determine X and Y. Proper selection of X and Y may optimize the performance of the system by decreasing the size of searched storage on one hand and decreasing the number of missed interactions on the other hand.

For each active file that is found in storage 140, 239, recovery mechanism 233 may read the content of the header of the file and get the status information that was saved in the header. Recovery mechanism 233 may use the status information read from the file header to associate the active file with its respective interaction. For example, Recovery mechanism 233 may use the identifiers stored in the file header to associate the active file with its respective interaction. Recovery mechanism 233 may recreate internal memory structure based on the data that was read from the file headers of the active files. The recovered internal memory structure may include a list of files that remained open in storage 140, 239 after the crash, and metadata related to these open files. To resume operation, recovery mechanism 233 may either continue to store data at the open files or close the open files. Closing the open files may include changing the tag to indicate that the file is inactive. The closing of the files may be reported to operational database 150.

Figure 3:
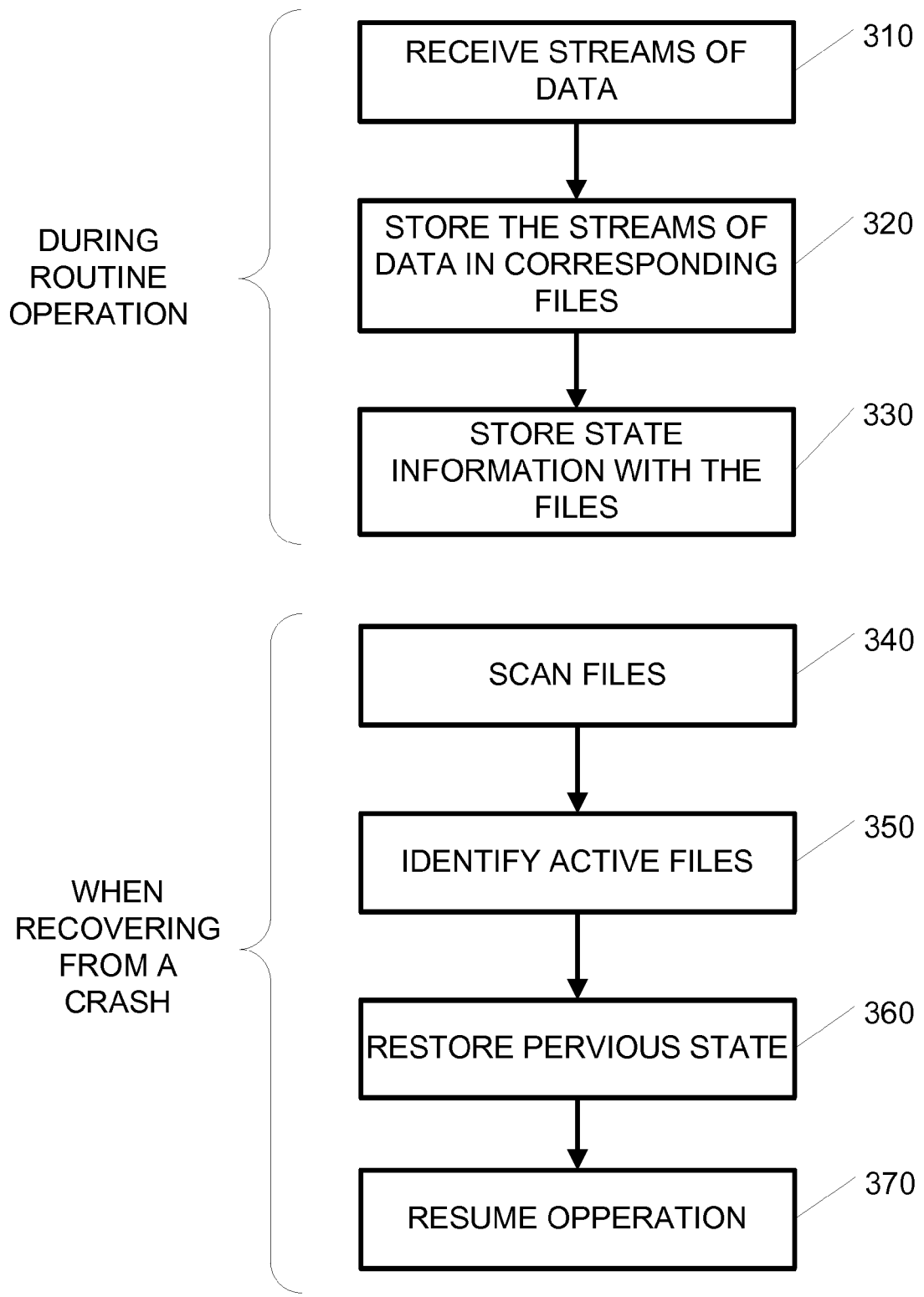
FIG. 3 is a flowchart illustration of a method for persistency free operation of a recorder according to embodiments of the present invention.

Reference is now made to FIG. 3, which is a flowchart illustration of a method for persistency-free operation of a recorder according to some embodiments of the present invention. According to some embodiments of the present invention, the method may include receiving streams of data, as indicated in block 310. Each stream may be stored in a corresponding file or a plurality of files in a non volatile storage, as indicated in block 320. In block 330 storing of state information may be coupled to storing of the streamed data and performed as part of the normal workflow of the method. In some embodiments, state information may be stored in the same files that store the recorded data. For example, state information may be added to file names and headers of the files. For example, a tag indicating whether the file is categorized as active or inactive may be added to the files, for example, to the file names. Other state information may be saved in headers of the files. For example, the header may include identifiers associating each file with its respective interaction. Additionally, files may be stored in a location that is indicative of the time in which they were created, as described in detail herein. Thus, the method may save persistency data, or state information, without maintaining and constantly updating dedicated persistency files and databases on a non-volatile memory device.

When recovering from a crash, the method may include scanning of the files in the storage, as indicated in block 340, and identifying active files, as indicated in block 350. For example, if the names of the files include a tag indicating whether the file is categorized as active or inactive, identifying active files may include scanning of the names of the files. If files were stored in a location that is indicative of the time in which they were created, only files stored in the non-volatile storage unit in a location that is associated with a predetermined time period before the crash may be scanned. In block 360, the previous state (e.g., the state prior to the crash) is restored. The state may be restored by generating a list of files that were identified as active files and including, in the list, required state information that was read from the headers of the active files. In operation 370, routine operation may be resumed. Open files from before the crash may be closed, or, if applicable, may continue to be active. For example, streamed data from the same interaction, if the interaction still continues, may be written to the corresponding file.

Reference is now made to FIG. 4, which is a schematic block diagram illustrating a persistency-free controller 420 according to embodiments of the present invention. Controller 420 may include a processor 422, memory unit 428 and non-volatile storage unit 429. Processor 422 may include components similar to processor 122 and may be any computation device that is configured to execute various operations including operations related to main workflow 424 and recovery block 423. Memory unit 428 may be a non-transitory computer-readable storage medium that may store thereon instructions that when executed by processor 422 cause processor 422 to perform operations and/or methods, for example, the method disclosed herein. According to embodiments of the present invention, state information that is needed to resume operation of controller 420 when recovering from a crash is saved by main workflow block 424 obviating the need for updating a dedicated controller persistency file on non-volatile storage unit 429. Thus, non-volatile storage unit 429 may not be needed for storing persistency data and in some application may not be needed at all.

During routine operation, main workflow block 424 of controller 420 may continuously handle processes related to metadata of streamed data, by sending commands to a controlled device 450. Main workflow block 424 of controller 420 may send to controlled device 450 state parameters related to these processes. When recovering from a crash, recovery mechanism 423 of controller 420 may retrieve the state parameters from controlled device 450, restore the state of controller 420 from before the crash, and resume normal operation. Thus, no dedicated persistency database is maintained and updated on a non-volatile storage device.

For example, controller 420 may be configured to handle processes related to recording of interactions, and specifically for handling metadata of streamed data of these recordings. Controlled device 450 may be a recorder such as recorder 130 presented in FIG. 1 or recorder 230 presented in FIG. 2. During routine operation, controller 420 may be notified that an interaction has initiated. For example, controller 420 may be notified from a private automatic branch exchange (PABX) that a telephone call has initiated. The main workflow block 424 of controller 420 may generate the interaction metadata, request the recorder to record the interaction and provide the recorder with all the state information required for resuming operation of controller 420 when recovering from a crash. The interaction may be listed in an active interaction table in the local memory cache of controller 420. When controller 420 is notified that the interaction has ended, main workflow block 424 of controller 420 may request the recorder to stop the recording and update operational database 150. The record of the interaction in the list of active interactions in the local memory cache of controller 420 may be deleted. No dedicated persistency file or database is maintained and updated on a non-volatile storage device. When controller 420 recovers from a crash, recovery mechanism 423 of controller 420 may request the state information from the recorder. Recovery mechanism 423 may request the recorder for the active recordings and their related metadata. Recovery mechanism 423 may reconstruct the active interaction table based on state information retrieved from the recorder. Thus, main workflow block 424 may resume operation from the point before the crash.

According to some embodiments, main workflow block 424 of controller 420 may generate the following metadata items and send these items to the recorder (these items are also included in table 1):

Interaction identification
Compound identification
Participants—identifies the participants in the interaction, e.g., a customer, an agent, etc.
Start time of the interaction—the time the interaction started.
Stop time of the interaction—the time the interaction ended. May be added only after the interaction ends.

Controller 420 may obtain, for example, the following items from the recorder during routine operation and update the open interaction table (these items are also included in table 2):

Interaction identification
Compound identification
Session identification—identifies each session of the interaction.
Start of session recording time—time of start of recording of a session.
Stop time of the session recording time—the time the recording of the session ended. May be added only after the recording of the session ends.
Call metadata—may include other metadata items related to the interaction or to the recording.

When resuming operation after a crash, all these items may be retrieved from the recorder and the open interaction table may be recreated.

TABLE 1

New fields CTI Call

| InteractionID | CTI interaction |
| CompoundID | CTI compound |
| Participants[ ] | Participants in the call |
| Call Start Time | Start of the call |
| Call Stop Time | End of the call |

TABLE 2

Recording

| InteractionID | Recorded interaction |
| CompoundID | Recording compound |
| SessionID | Recorded session identification |

TABLE 2-continued

Recording

| Session Start Time | Start of the recorded session |
| Session Stop Time | Stop of the recorded session |
| Call Metadata | Other call metadata items |

Figure 5:
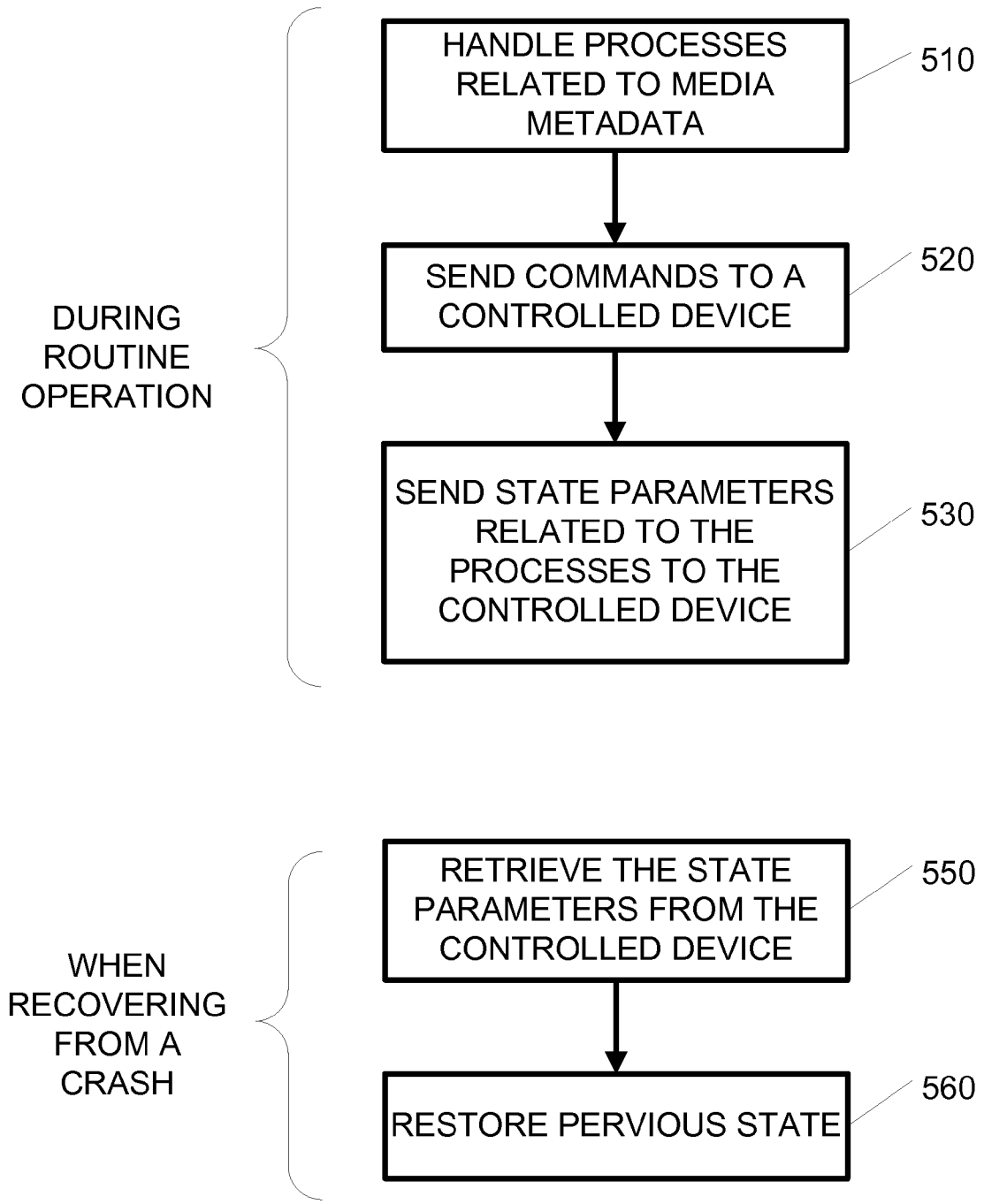
FIG. 5 is a flowchart illustration of a method for persistency free operation of a controller according to embodiments of the present invention.

Reference is now made to FIG. 5 which is a flowchart illustration of a method for persistency-free operation of a controller according to some embodiments of the present invention. According to some embodiments of the present invention, processes related to media metadata may be handled, as indicated in block 510. In block 520, commands related to the processes may be sent to the controlled device. In block 530, state parameters related to the processes may be sent to the controlled device. The state parameters may be sent together with the commands or closely to sending the commands. When recovering from a crash the state parameters may be retrieved from the controlled device, as indicated in block 550. The previous state may be restored based on the retrieved state parameters, as indicated in block 560, and operation may be resumed, as indicated in block 570.

Persistency-free architecture according to embodiments of the present invention may improve software performance and reduce coding complexity. Keeping local persistency files may cause ongoing performance degradation since the state must be updated with every change. This burden is reduced dramatically when implementing the persistency free-architecture presented herein.

Some embodiments of the present invention may be implemented in software for execution by a processor-based system, for example, controller 420 and recorder 230. For example, embodiments of the present invention may be implemented in code or software and may be stored on a non-transitory storage medium having stored thereon instructions which, when executed by a processor, cause the processor to perform methods as discussed herein, and can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for managing media storage, the method comprising:
   during routine operation, a recorder:
   continuously receiving, at the recorder, streams of media data including at least an audio interaction, while the interaction is taking place;
   storing each of the streams of data in one or more files corresponding to the stream, in a non-volatile storage while the interaction is taking place;
   including in the header of each of the files, a tag indicating whether the file is categorized as active and an identifier associating the file with a respective interaction, the file being active while storing of a stream of data continues or inactive, the file being inactive after storing of a stream of data ends, wherein including the tag comprises:
   upon creating the file, including in the header, a first tag indicating that the file is categorized as active; and
   when the file becomes full or when all data related to one of the streams has been stored in the file, replacing, by the recorder, the first tag with a second tag indicating that the file is categorized as inactive;
   during the routine operation, a controller sending to the recorder state parameters required to resume operation of the controller when recovering from a controller crash, wherein the state parameters comprise interaction metadata of the streams;
   when recovering from a recorder crash:
   generating, at the recorder, a list of active files by scanning the files and identifying active files based on the tags included in the files indicating that the files are categorized as active and associating each active file with its respective interaction based on the identifier; and
   wherein recovering from a controller crash:
   retrieving the state parameters from the recorder; and
   resuming operation of the recorder.

2. The method of claim 1, comprising:
   during the routine operation:
   storing the files in the non-volatile storage in a location that is indicative of the time the files where created.

3. The method of claim 2,
   wherein, scanning the files comprises scanning the files stored at a location that is associated with a predetermined time period before the crash.

4. The method of claim 1, comprising:
   when recovering from the recorder crash:
   closing the active files by replacing the tag with a tag indicating that the files are categorized as inactive.

5. The method of claim 1, comprising:
   when recovering from the recorder crash:
   associating each of the active files with its respective interaction according to the identifiers in the header of the file.

6. The method of claim 1, wherein the identifiers associating each file with its respective interaction is selected from the list consisting of:
   interaction identification, compound identification, recorded session identification and time of start of recorded session.

7. The method of claim 1, wherein the state parameters are selected from the list consisting of:
   interaction identification, compound identification, participants and start time of the interaction.

8. A system for managing media storage, the method comprising:
   a Non-volatile storage unit;
   a controller; and
   a recorder,
   wherein during routine operation, the recorder is configured to:
   continuously receiving, at the recorder, streams of media data including at least an audio interaction, while the interaction is taking place;
   store each of the streams of data in one or more files corresponding to the stream, in a non-volatile storage while the interaction is taking place; and
   include in the header of each of the files, a tag indicating whether the file is categorized as active and an identifier associating the file with a respective interaction, the file being active while storing of a stream of data continues or inactive, the file being inactive after storing of a stream of data ends, wherein the recorder is configured to replace the first tag with a second tag indicating that the file is categorized as inactive when the file becomes full or when all data related to one of the streams being store in the file;
   wherein the recorder is configured to, when recovering from a recorder crash:
   generate a list of active files by scanning the files and identifying active files based on tags included in the files indicating that the files are active, and associate each file with its respective interaction based on the identifier; and
   wherein the controller is configured to:
   during the routine operation, send the recorder state parameters required to resume operation of the controller when recovering from a controller crash, wherein the state parameters comprise state of the interaction metadata of the streams; and
   when recovering from a controller crash, retrieve the state parameters from the recorder.

9. The system of claim 8, wherein during the routine operation the recorder is further configured to:
   store the files in the non-volatile storage in a location that is indicative of the time the files where created.

10. The system of claim 8 wherein when recovering from the recorder crash, the recorder is further configured to:
    scan the files stored at a location that is associated with a predetermined time period before the crash.

11. The system of claim 8, wherein when recovering from the recorder crash, the recorder is further configured to:
    close the active files by replacing the tag with a tag indicating that the files are categorized as inactive.

12. The system of claim 8, wherein when recovering from the recorder crash, the recorder is further configured to:
    associate each of the active files with its respective interaction according to the identifiers in the header of the file.

13. The system of claim 8, wherein: the media metadata comprises metadata; and the state parameters are selected from the list consisting of: interaction identification, compound identification, participants and start time of the interaction.

* * * * *